(No Model.)

J. S. BROWN.
DOUGH RAISER.

No. 489,153.

2 Sheets—Sheet 1.

Patented Jan. 3, 1893.

Witnesses
Harry L. Ames
N. W. Riley

Inventor
Joseph S. Brown.
By his Attorneys,
C. A. Snow & Co.

(No Model.) 2 Sheets—Sheet 2.

J. S. BROWN.
DOUGH RAISER.

No. 489,153. Patented Jan. 3, 1893.

Witnesses
Harry L. Ames
N. H. Riley

By his Attorneys,
C. A. Snow & Co.

Inventor
Joseph S. Brown.

THE NORRIS PETERS CO., PHOTO-LITHO., WASHINGTON, D. C.

UNITED STATES PATENT OFFICE.

JOSEPH S. BROWN, OF ACADEMIA, PENNSYLVANIA.

DOUGH-RAISER.

SPECIFICATION forming part of Letters Patent No. 489,153, dated January 3, 1893.

Application filed July 27, 1892. Serial No. 441,391. (No model.)

*To all whom it may concern:*

Be it known that I, JOSEPH S. BROWN, a citizen of the United States, residing at Academia, in the county of Juniata and State of Pennsylvania, have invented a new and useful Dough-Raiser, of which the following is a specification.

The invention relates to improvements in dough raisers.

The object of the present invention is to provide a simple and inexpensive receptacle in which dough may be mixed and when mixed may be maintained at the desired temperature for raising.

The invention consists in the construction and novel combination and arrangement of parts hereinafter fully described, illustrated in the accompanying drawings and pointed out in the claims hereto appended.

Figure 1:
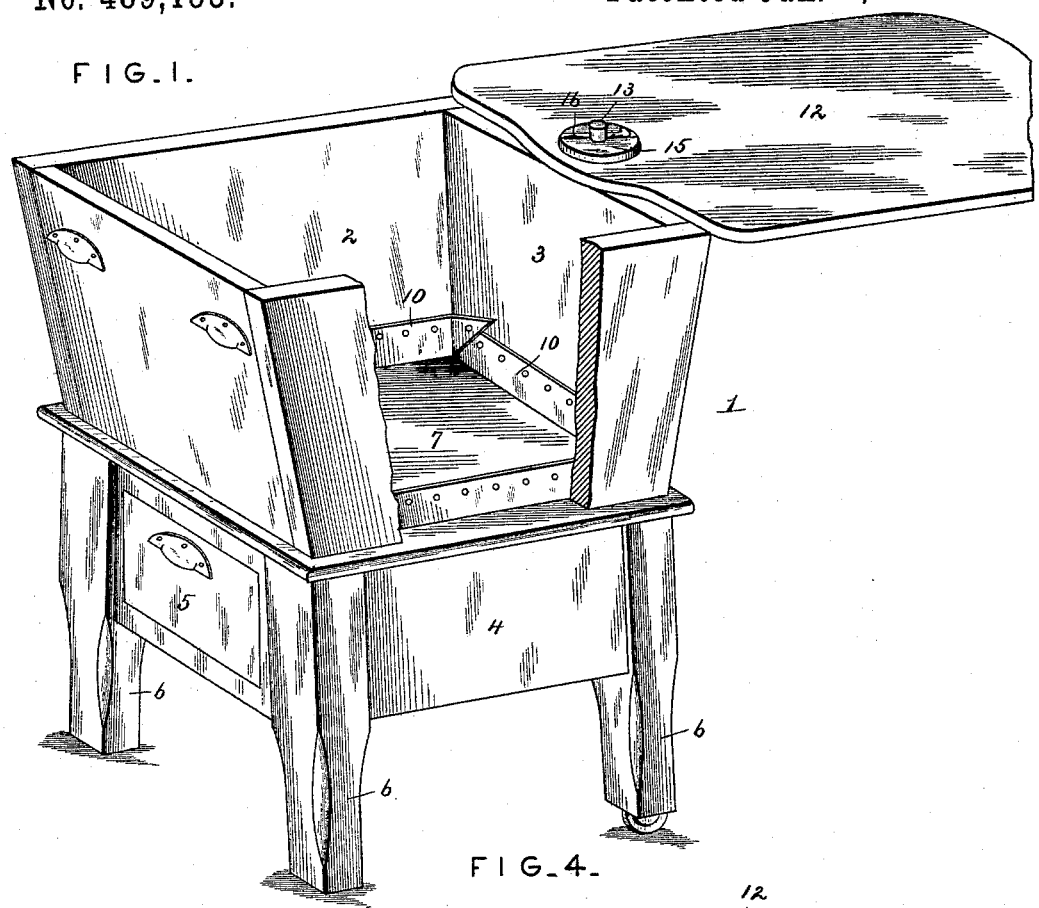
Figure 4:
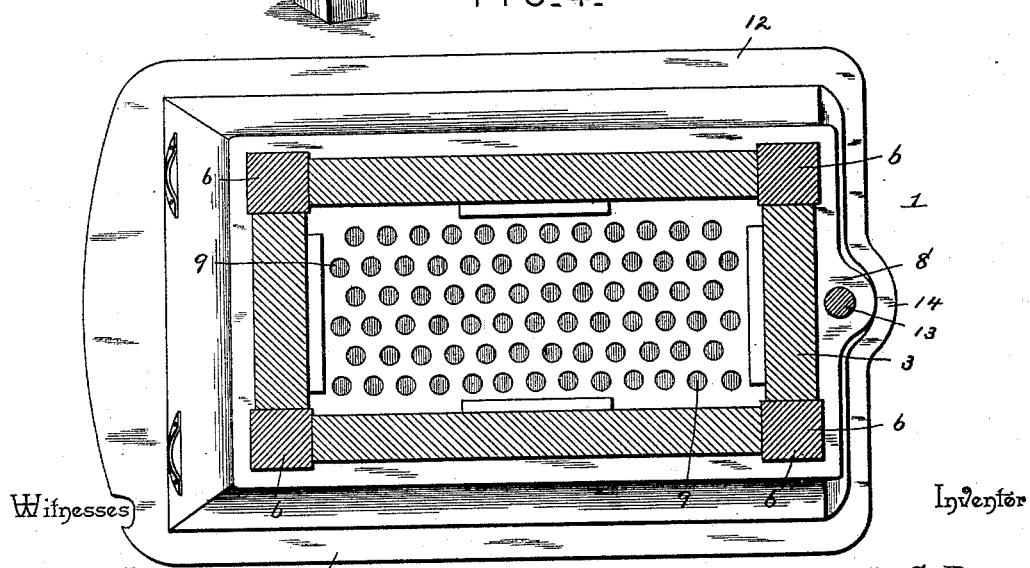
Figure 2:
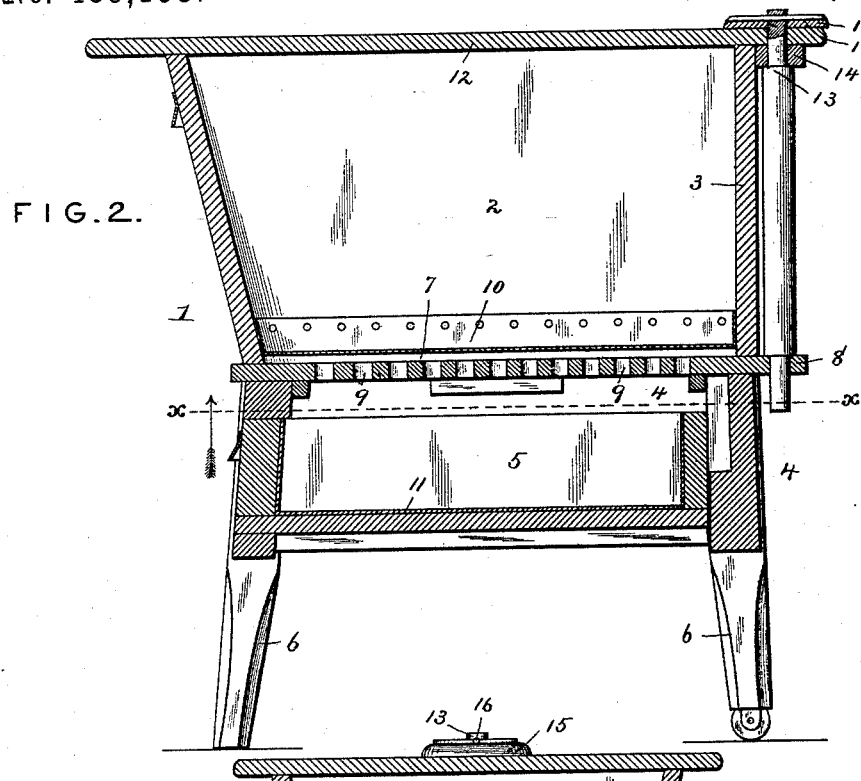
Figure 3:
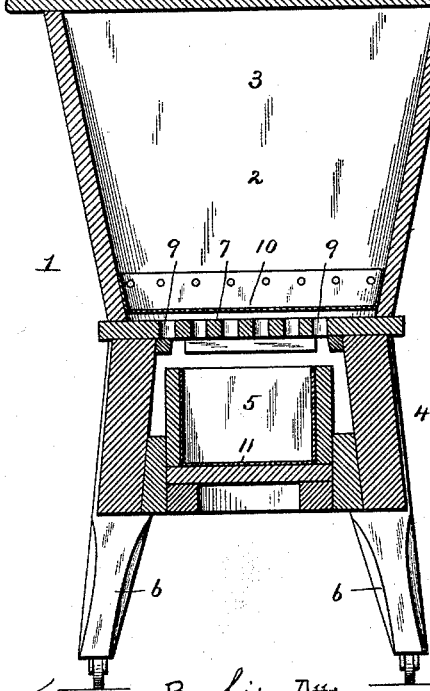

In the drawings—Figure 1 is a perspective view of a dough raiser constructed in accordance with this invention, the cover being swung back to form a table and to expose the dough receptacle. Fig. 2 is a vertical longitudinal sectional view. Fig. 3 is a transverse sectional view. Fig. 4 is a horizontal sectional view on line $x$, $x$ of Fig. 2 looking upward.

Like numerals of reference indicate corresponding parts in all the figures of the drawings.

1 designates a dough raiser comprising an upper flaring dough receptacle 2 having a straight end 3, and a lower portion 4 having a drawer 5 and supported by legs 6 arranged at its corners. The sides and front end of the dough receptacle are inclined outward, and its bottom 7 has a rearward extension 8 and is provided within the side with perforations, 9, and is covered on its upper face with a sheet metal lining 10 which covers the perforations, and extends a short distance up the sides of the receptacle. The removable drawer 5 is provided with a sheet metal lining 11 and is adapted to contain hot water, hot bricks or the like to supply the necessary heat for raising the dough and the perforations of the bottom and the sheet metal linings of the latter, permit the heat rising from the drawer to be readily conducted to the contents of the dough receptacle.

The dough receptacle is provided with a pivoted cover 12 adapted to be turned rearward as illustrated in Fig. 1 of the accompanying drawings when it is desired to open the dough receptacle, and it also serves as a leaf or table upon which articles necessary to the mixing of dough or the like may be placed within convenient reach. The pivot 13 of the cover has its ends reduced; the lower one is arranged in the perforation of the extension 8 of the bottom 7; and the upper end of the pivot is arranged in an opening of a cleat 14 secured to the straight rear end of the receptacle at the top thereof. The cover is maintained in a horizontal position and prevented from sagging by a disk 15 provided with a central opening to receive the upper end of the pivot, and secured to the latter by a key 16 and having a groove to receive the same. The key 16 has one end bent at right angles and is arranged in an angular branch of the groove.

The heat is regulated to maintain the desired temperature by means of the drawer, which, when closed, will cause the greatest heat to be communicated to the receptacle, and by partially opening the drawer the amount of heat will be reduced by permitting the entrance of the outside air, and exposing the contents of the drawer to the same.

When not used for raising dough the receptacle is adapted for the reception of baked loaves which will be kept free from dust, insects and the like.

The front of the drawer and the receptacle are provided with handles, and the legs are provided with casters, to enable the dough raiser to be readily moved from one place to another.

What I claim is—

1. A dough raiser, comprising an upper dough receptacle having a bottom provided with perforations, a sheet metal lining covering the bottom, a lower portion provided with legs and having a removable drawer, and a pivoted cover adapted to be swung horizontally, substantially as described.

2. A dough raiser, comprising an upper receptacle having a bottom provided with perforations, said bottom having a rearward extension provided with an opening, a cleat secured to the back of the receptacle and arranged above the extension and having an opening, a vertically disposed pivot having reduced ends and arranged in the openings of the extension and the cleat, a cover having an opening to receive the pivot, a disk arranged on the cover and having a pivot opening, a key arranged on the upper face of the disk and passing through the pivot and a drawer arranged beneath the bottom of the receptacle, substantially as described.

In testimony that I claim the foregoing as my own I have hereto affixed my signature in the presence of two witnesses.

JOS. S. BROWN.

Witnesses:
JOHN H. PIGG,
FERD. MEYERS.